United States Patent
Chun et al.

(10) Patent No.: US 9,001,717 B2
(45) Date of Patent: Apr. 7, 2015

(54) METHOD AND APPARATUS OF TRANSMITTING AND RECEIVING SIGNAL IN A DISTRIBUTED ANTENNA SYSTEM

(75) Inventors: Jin Young Chun, Anyang-si (KR); Ji Won Kang, Anyang-si (KR); Su Nam Kim, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 13/639,332

(22) PCT Filed: Apr. 21, 2011

(86) PCT No.: PCT/KR2011/002895
§ 371 (c)(1),
(2), (4) Date: Oct. 4, 2012

(87) PCT Pub. No.: WO2011/132968
PCT Pub. Date: Oct. 27, 2011

(65) Prior Publication Data
US 2013/0028218 A1    Jan. 31, 2013

(30) Foreign Application Priority Data

Apr. 22, 2010    (KR) .................. 10-2010-0037378

(51) Int. Cl.
| | |
|---|---|
| H04B 7/00 | (2006.01) |
| H04W 16/10 | (2009.01) |
| H04L 5/00 | (2006.01) |
| H04W 28/04 | (2009.01) |
| H04W 72/08 | (2009.01) |
| H04W 88/08 | (2009.01) |

(52) U.S. Cl.
CPC ............. *H04W 16/10* (2013.01); *H04L 5/0023* (2013.01); *H04L 5/0035* (2013.01); *H04L 5/006* (2013.01); *H04L 5/0073* (2013.01); *H04W 28/04* (2013.01); *H04W 72/082* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 7,286,507 | B1 | 10/2007 | Oh et al. |
| 2004/0204105 | A1 | 10/2004 | Liang et al. |
| 2004/0218697 | A1* | 11/2004 | Liu ............................. 375/340 |
| 2005/0227698 | A1* | 10/2005 | Nonin et al. ............... 455/452.2 |
| 2008/0069031 | A1* | 3/2008 | Zhang et al. ................. 370/328 |
| 2008/0248805 | A1* | 10/2008 | Han et al. ..................... 455/450 |
| 2009/0180426 | A1 | 7/2009 | Sabat et al. |
| 2009/0253429 | A1 | 10/2009 | Lee et al. |
| 2009/0280760 | A1* | 11/2009 | Ohwatari et al. .......... 455/127.2 |
| 2010/0016023 | A1 | 1/2010 | Yamauchi et al. |
| 2010/0099451 | A1* | 4/2010 | Saban et al. .................. 455/502 |
| 2010/0157917 | A1* | 6/2010 | Jeong et al. .................. 370/329 |
| 2010/0304773 | A1* | 12/2010 | Ramprashad ................ 455/509 |

* cited by examiner

*Primary Examiner* — Kevin C Harper
(74) *Attorney, Agent, or Firm* — McKenna Long & Aldridge LLP

(57) ABSTRACT

A method of transmitting a signal from a base station to a user equipment in a multi-node system is disclosed. The method comprises the steps of allocating a resource of a certain zone to each of nodes in accordance with a radio resource multiplexing scheme; and transmitting the signal to the user equipment by using a resource zone allocated to the node.

16 Claims, 9 Drawing Sheets

METHOD AND APPARATUS OF TRANSMITTING AND RECEIVING SIGNAL IN A DISTRIBUTED ANTENNA SYSTEM

This Application is a 35 U.S.C. §371 National Stage Entry of International Application No. PCT/KR2011/002895, filed Apr. 21, 2011 and claims the benefit of Korean Application No: 10-2010-0037378, filed Apr. 22, 2010, all of which are incorporated by reference in their entirety herein.

TECHNICAL FIELD

The present invention relates to a method of transmitting and receiving a signal in a multi-node system (e.g., DAS), and more particularly, to a method of transmitting or receiving a signal to or from at least one node of a multi-node system and an apparatus thereof.

BACKGROUND ART

With the development of the information industry, the technology that can transmit various kinds of large data at high speed has been required. In this respect, a multi-node system that adopts a plurality of nodes has been studied to remove a shade zone and extend coverage.

The multi-node system uses a plurality of nodes each of which may represent a base station, an access point, an antenna, an antenna group or a radio remote header (RRH). The plurality of nodes may be managed by one base station/base station controller which control and schedule the nodes' operation.

Distributed nodes connected with a single base station/base station controller through a cable or a dedicated line, wherein the single base station/base station controller manages a plurality of nodes located within a cell at predetermined intervals. This multi-node system may be regarded as a multiple input multiple output (MIMO) system in that distributed nodes can support a single user equipment or multiple user equipments by transmitting and receiving different data streams at the same time. In view of the MIMO system, the multi-node system is advantageous in that it can reduce a transmission power as a transmission zone is more reduced than that of the CAS due to nodes distributed at various locations within a certain geographical area. Also, the multi-node system can reduce path loss by reducing a transmission distance between a node and a user equipment, thereby enabling high rate transmission of data. As a result, the multi-node system can enhance transmission capacity and power efficiency of the cellular system, and can satisfy communication throughput of quality more relatively uniform than that of the CAS regardless of user location within the certain geographical area. Also, since the base station/base station controller(s) connected with a plurality of distributed nodes cooperates in the multi-node system, signal loss is reduced, and correlation and interference between the antennas are reduced, whereby a high signal to interference to noise ratio (SINR) can be obtained.

As described above, in order to reduce facility costs of the base station and maintenance costs of a backbone network in a next generation mobile communication system and at the same time extend service coverage and improve channel capacity and SINR, the multi-node system can be a new basis of cellular communication by being compatible with the existing CAS or replacing with the CAS.

DISCLOSURE OF INVENTION

Technical Problem

In a multi-node system, independent downlink data can simultaneously be allocated to each node controlled by one base station or base station controller. At this time, if the same frequency resource is allocated to all nodes, interference between neighboring nodes occurs. Accordingly, an object of the present invention is to provide a method and apparatus of transmitting and receiving a signal in a distributed antenna system, in which interference that may occur in each node in a multi-node system is reduced, and a frequency resource zone is divided per node to increase throughput of a downlink.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method of transmitting a signal from a base station to a user equipment in a distributed antenna system (DAS) comprises the steps of allocating a resource of a certain zone to each of distributed antennas (DAs) or DA groups in accordance with a radio resource multiplexing scheme; and transmitting the signal to the user equipment by using the resource zone allocated to the DA or DA group.

The step of allocating a resource of a certain zone to each of DAs or DA groups includes dividing frequency resources to allow each DA or DA group to use a frequency band different from that of another neighboring DA or DA group.

If the frequency resources are divided in accordance with one embodiment of the present invention, each of centralized antennas (CAs) located in each cell-division zone uses its respective frequency band based on one or more cell-division zones constituting a cell zone where the base station provides a service. At this time, the step of allocating a resource of a certain zone to each of DAs or DA groups includes dividing the other frequency band except for the frequency band allocated to the CA located in the same cell division zone as that of the DA or DA group located in each cell division zone.

If the frequency resources are divided in accordance with one embodiment of the present invention, the step of allocating a resource of a certain zone to each of DAs or DA groups includes dividing all frequency bands used by the base station depending on the number of the DAs or DA groups and allocating the divided frequency bands to each of the DAs or DA groups.

The step of allocating a resource of a certain zone to each of DAs or DA groups includes dividing the radio resource into time resources to allow each DA or DA group to use the same frequency band as that of another neighboring DA or DA group at different time bands.

The method further comprises the step of transmitting at least one of information on a DA or DA group dedicated for the user equipment and information on a resource zone allocated to the DA or DA group dedicated for the user equipment to the user equipment.

In another aspect of the present invention, a method of transmitting a signal from a base station to a user equipment in a distributed antenna system (DAS) comprises the steps of identifying a specific DA or DA group associated with the user equipment among distributed antennas (DAs) or DA groups; allocating a resource to the specific DA or DA group; and transmitting the signal to the user equipment through the specific DA or DA group by using the allocated resource, wherein the step of allocating a resource to the specific DA or DA group includes applying permutation of the specific DA or DA group differently in a resource zone equally allocated to the DAs or DA groups.

Permutation of each of the DAs or DA groups differently sets at least one of procedures of subband partitioning, miniband permutation, frequency partitioning, contiguous resource unit (CRU)/distributed resource unit (DRU) allocation, subcarrier permutation, random sequence generation for permutation, generation of minimum A-MAP logical resource unit (MLRU), and LRU mapping.

In this case, the permutation is performed based on index of antennas included in the DAs or DA groups.

The method further comprises the step of transmitting information on the specific DA or DA group to the user equipment.

Also, the method further comprises the step of transmitting at least one of information on the specific DA or DA group and parameter information of the permutation applied to the specific DA or DA group to the user equipment. The method further comprises the step of transmitting power boosting level information on the frequency resource(s) allocated to the specific DA or DA group through the specific DA or DA group.

In still another aspect of the present invention, a method of receiving a signal in a user equipment from a base station in a distributed antenna system (DAS) comprises the steps of receiving at least one of information on a specific DA or DA group associated with the user equipment and frequency resource information allocated to the specific DA or DA group; and receiving the signal from the base station by using the resource allocated to the specific DA or DA group, wherein the resource allocated to the specific DA or DA group is the resource of a certain zone allocated in accordance with a radio resource multiplexing scheme.

The resource of the certain zone allocated to the specific DA or DA group is a frequency resource of a certain zone allocated by dividing a radio resource into frequency resources to allow each DA or DA group to use a frequency band different from that of another neighboring DA or DA group.

In further still another aspect of the present invention, a method of receiving a signal in a user equipment from a base station in a distributed antenna system (DAS) comprises the steps of receiving information on a specific DA or DA group associated with the user equipment; receiving the signal from the base station by using the resource allocated to the specific DA or DA group, wherein resource allocation permutation different from that of another neighboring DA or DA group is applied to the resource allocated to the specific DA or DA group.

In further still another aspect of the present invention, a base station of a distributed antenna system (DAS) comprises an antenna module including distributed antennas (DAs) or DA groups; a transmitting module for transmitting a signal; and a processor allocating a resource of a certain zone to each of the DAs or DA groups in accordance with a radio resource multiplexing scheme or differently applying resource allocation permutation the DAs or DA groups in the same resource zone shared by the DAs or DA groups, wherein the processor identifies a specific DA or DA group associated with a user equipment and transmits a signal to the user equipment by using the resource of the certain zone allocated to the specific DA or DA group.

The aforementioned embodiments are only a part of the preferred embodiments of the present invention, and various embodiments reflecting technical features of the present invention will be understood by the person with ordinary skill in the art based on the detailed description of the present invention.

Advantageous Effects of Invention

According to the embodiments of the present invention, interference that may occur in each node during wireless communication in a multi-node system can be reduced, and throughput of a downlink and an uplink can be increased.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
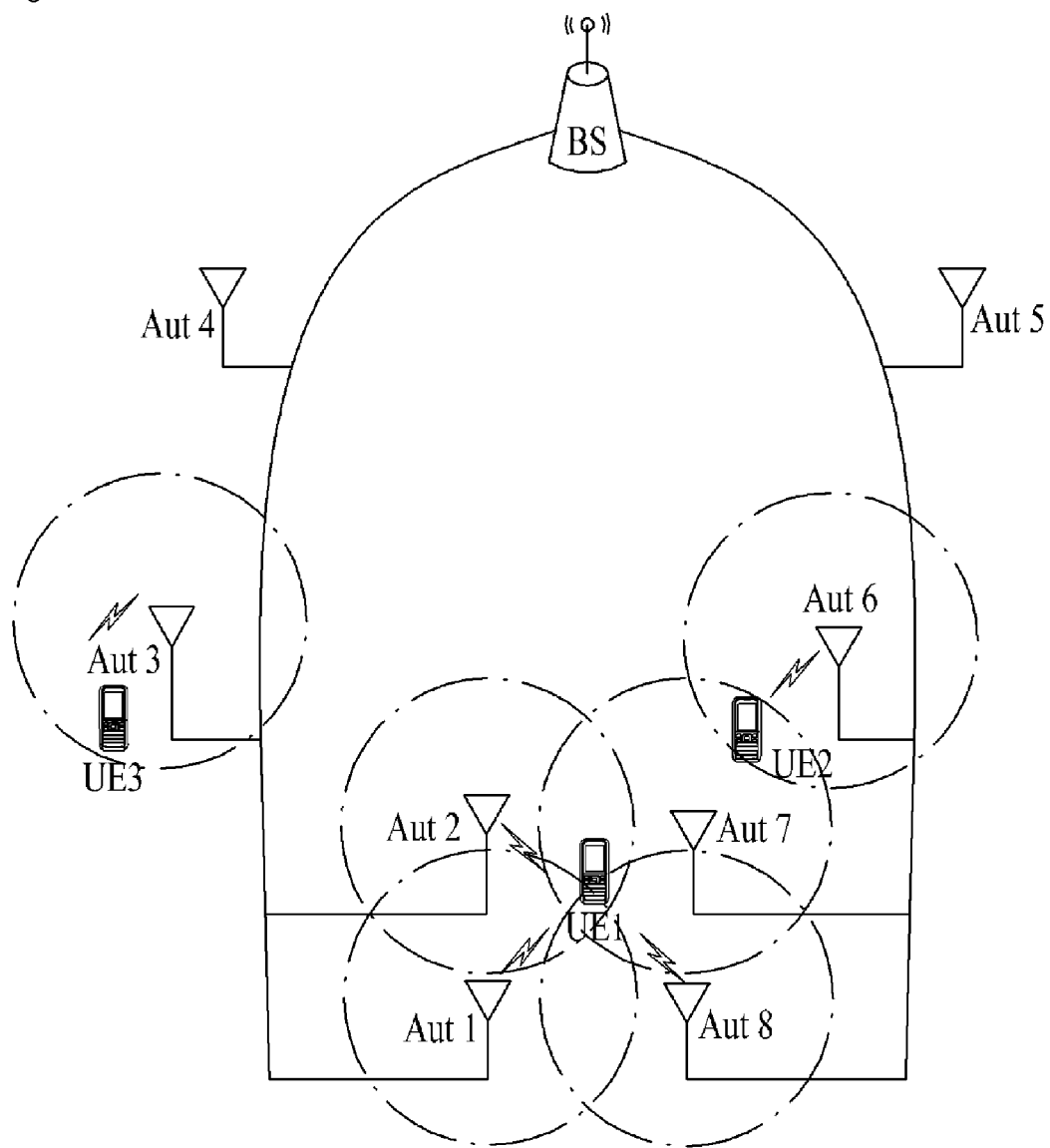
FIG. 1 is a diagram illustrating an example of a DAS structure to which the present invention is applied.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. ForHereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on an institute electrical and electronics engineers (IEEE) 802.16 system, the following description can be applied to various wireless communication systems, such as a 3rd generation partnership project (3GPP) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) will refer to a mobile station (MS), or a mobile or fixed type user terminal device. Also, it is assumed that a base station will refer to a random node of a network terminal that performs communication with a user equipment, such as Node B (NB), eNode B (eNB), and processing server (PS).

The present invention can be applied to various types of multi-node systems. For example, embodiments of the present invention can be applied to the multi-node system such as a distribute antenna system (DAS), macro-node with low-power RRHs, a multi-base station cooperative system, a femto-/pico-cell cooperative system, a combination thereof and etc. One or more base stations connected to the plurality of nodes in the multi-node system can cooperate to simultaneously transmit/receive a signal to/from a user equipment.

The DAS uses a plurality of distributed antennas connected with a single base station/base station controller through a cable or a dedicated line, wherein the single base station/base station controller manages a plurality of antennas located at predetermined interval within a certain geographical region (also called a cell) managed by the single base station/base station controller. Each antenna and/or each antenna group in the DAS can be a node of the multi-node system of the present invention, and each node of the DAS operates as a subset of antennas equipped in the single base station. The DAS is a kind of multi-node system, and the distributed antenna or antenna group in DAS is a kind of node in multi-node system. The DAS provided with a plurality of antennas located within a cell at predetermined intervals is different from a centralized antenna system (CAS) provided with a plurality of antennas centralized at the center of a cell. The DAS is different from a femto cell in that all distributed antennas located within a cell are managed by a base station/base station controller at the center of the cell not each unit of the distributed antennas. Also, the DAS is different from a multi-hop relay system or ad-hoc network in that distributed antenna units are connected with one another through a cable or a dedicated line, wherein the multi-hop relay system or ad-hoc network include a base station connected with a relay station (RS) through a wireless mode. Moreover, the DAS is different from a repeater, which simply amplifies and transmits a signal, in that each of distributed antennas can transmit different signals to different user equipments located near the antennas in accordance with a command of a base station/base station controller.

Each node of the multi-base station cooperative system, or the femto-cell or pico-cell cooperative system operates as an independent base station and cooperates with each other. Each base station of the multi-base station cooperative system or the femto-/pico-cell cooperative system can be a node in the multi-node system of the present invention. The multiple nodes of the multi-base station cooperative system, or the femto-cell or the pico-cell cooperative system are connected with one another via a backbone network and the like, and perform cooperative transmission/reception by performing scheduling and/or handover together.

Although there are differences among the DAS, macro-node with low-power RRHs, the multi-base station cooperative system, the femto-/the pico-cell cooperative system, and etc, embodiments of the present invention can be applied to them all since they are different from a single-node system (e.g., a CAS, a conventional MIMO system, a conventional relay system, a conventional repeater system, and etc.) and a plurality of nodes of them participate in providing communication service for a user equipment in cooperative manner. Hereinafter, for the convenience's sake of description, the present invention will be described, taking an example of the DAS. However, the following description is only an exemplary, and the present invention is also applicable to other multi-node system in the same manner since an antenna or an antenna group of the DAS can be corresponding to a node of other multi-node system and a single base station of the DAS can be corresponding to one or more cooperative base stations of other multi-node system.

FIG. 1 is a diagram illustrating an example of a DAS structure to which the present invention is applied.

The base station illustrated in FIG. 1 may include a plurality of antennas located at the center of a cell in accordance with a CAS. For conciseness of description, however, DAS antennas are only illustrated in FIG. 1. In a DAS, a plurality of antennas connected with a single base station, which is located within a cell, through a cable are distributed at various locations within the cell. This DAS can be configured in various manners depending on the number and location of antennas. For example, a plurality of antennas may be distributed within the cell at constant intervals or two or more antennas may be centralized at a specific place. If coverage of each of the distributed antennas is overlapped with that of another distributed antenna, signal transmission of rank 2 or more can be performed in the DAS regardless of the location of the distributed antennas within the cell. Rank means the number of data streams that can be transmitted at the same time through one or more antennas.

Referring to FIG. 1, one base station that provides communication service to one cell zone is connected with a total of eight antennas through a cable, wherein the respective antennas are located at constant intervals or various intervals within the cell. In the DAS, all the antennas connected with the base station are not needed to be used, and a proper number of antennas can be used based on their signal transmission range, an overlap level of coverage and interference with their neighboring antenna, and the distance with the user equipment. For example, if three user equipments (UE 1 to UE 3) are located within the cell and UE 1 is located within a signal transmission range of the antennas 1, 2, 7 and 8 as illustrated in FIG. 1, the UE 1 can receive a signal from one or more of the antennas 1, 2, 7 and 8 of the base station. On the other hand, in view of the UE 1, it is likely that high path loss may occur in signals transmitted from the antennas 3, 4, 5 and 6 and power consumption may be increased therein due to a long distance between the corresponding antennas and the user equipment UE 1. It is likely that the signals transmitted from the antennas 3, 4, 5 and 6 may have small intensity that may be disregarded. For another example, since the UE 2 is located in a portion where the signal transmission range of the antenna 6 is overlapped with that of the antenna 7, the signals transmitted through the other antennas except for the antennas 6 and 7 may be small or weak values that may be disregarded. Also, since the UE 3 is located within a neighboring distance of the antenna 3, it can exclusively receive the signal transmitted through the antenna 3.

As illustrated in FIG. 1, if a plurality of antennas are spaced apart from one another within the cell of the DAS, the DAS is operated like a MIMO system. The base station can perform communication with the UE 1 through an antenna group 1 configured by one or more of the antennas 1, 2, 7 and 8, communication with the UE 2 through an antenna group 2 configured by one or more of the antennas 6 and 7, and communication with the UE 3 through the antenna 3. At this time, the antennas 4 and 5 may perform transmission for the UE 3 and the UE 2, respectively, or may be operated in an idle state.

In other words, the DAS may transmit various numbers of data streams for each user equipment during communication with a single user/multiple users. Also, various antennas or antenna groups may be allocated to user equipments located within the cell supported by the base station in the DAS. A specific antenna or antenna group, which performs communication with a user equipment, may be defined depending on the location of the corresponding user equipment located within the cell. Alternatively, the antenna or antenna group, which performs communication with a user equipment, may adaptively be changed depending on movement of the user equipment within the cell.

Figure 2:
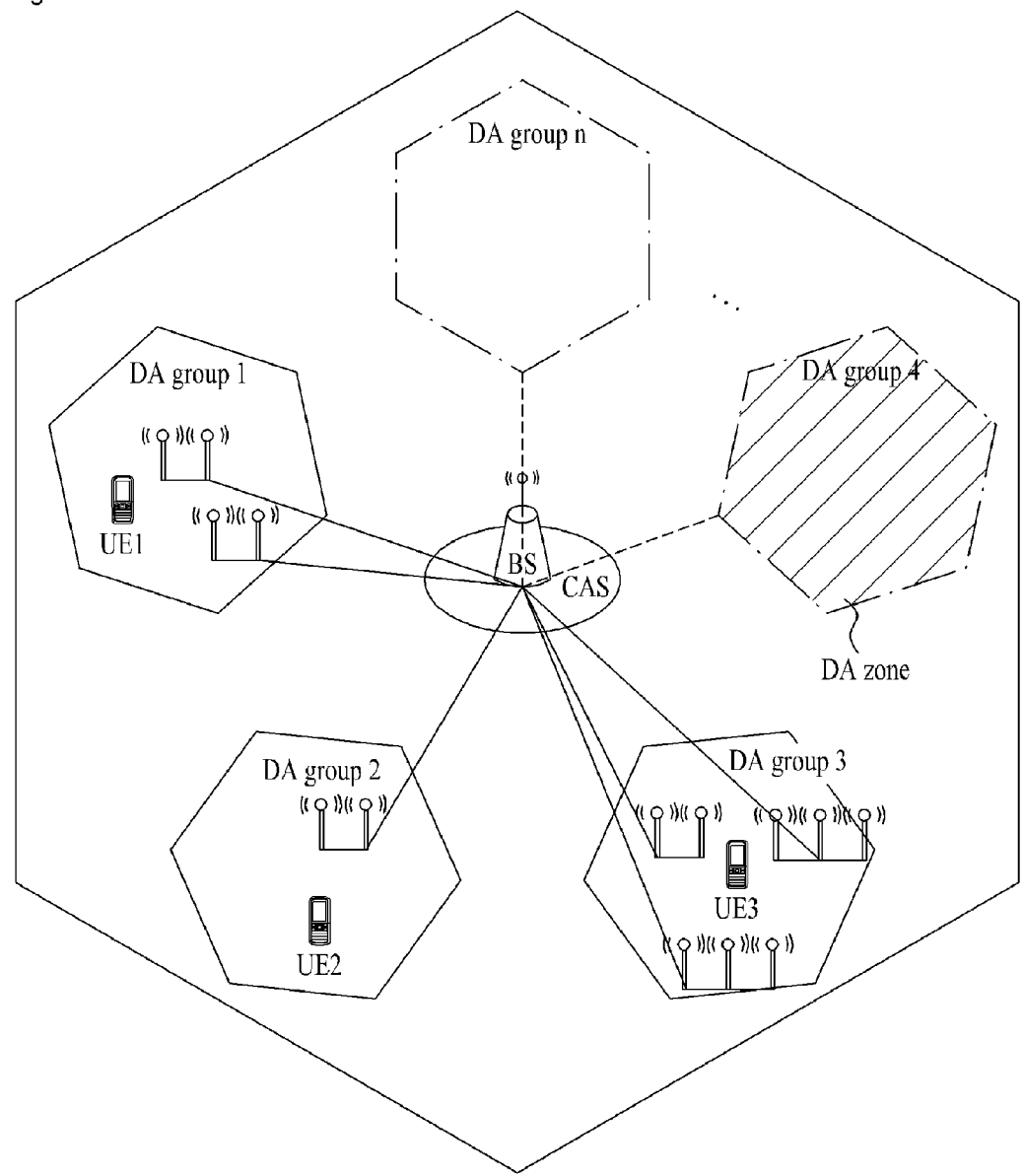
FIG. 2 is a diagram illustrating another example of a DAS structure to which the present invention is applied.

FIG. 2 is a diagram illustrating another example of a DAS structure to which the present invention is applied. In more detail, FIG. 2 illustrates an example of a system structure when a DAS is applied to a centralized antenna system that uses cell based multiple antennas according to the related art.

Referring to FIG. 2, a plurality of centralized antennas (CAs) having a similar effect in path loss due to an antenna interval shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone. The DAs are configured by one or more antennas connected to the base station through one cable. The one or more DAs form one DA group, thereby forming a DA zone.

The one or more DAs forming one DA group can correspond to a node in the multi-node system.

The DA group, which includes one or more DAs, may variably be configured depending on the location or receiving status of the user equipment, or may fixedly be configured (by the number of maximum antennas used in MIMO). According to the IEEE 802.16m, the number of maximum antennas is 8Tx. The DA zone is defined by the range that the antennas constituting the DA group can transmit or receive a signal. The cell zone illustrated in FIG. 2 includes n number of DA zones. The user equipment that belongs to the DA zone can perform communication with one or more the DAs constituting the DA zone, and the base station can increase a transmission rate by using the DAs and the CAs at the same time during signal transmission to the user equipment belonging to the DA zone.

A CAS that includes a DAS is illustrated in FIG. 2, whereby the base station and the user equipment can use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

Since different data streams can be transmitted at the same time per DA or DA group in the DAS to support a single user equipment or multiple user equipments, independent downlink can be allocated per each DA or DA group. At this time, if the same frequency band is used by all DAs or DA groups, problems occur in that propagation interference between the DAs or DA groups occurs and efficiency in signal transmission and reception is reduced.

Accordingly, in order to reduce interference and increase efficiency in signal transmission and reception, one embodiment of the present invention is intended to suggest a method of dividing frequency resources between DAs.

First Embodiment

A method of managing a radio resource between antennas in a DAS according to one embodiment of the present invention includes a scheme of multiplexing a radio resource between antennas to reduce interference between respective antennas. Examples of the scheme of multiplexing a radio resource include a frequency division multiplexing (FDM) scheme, a time division multiplexing (TDM) scheme, and a hybrid scheme of the FDM scheme and the TDM scheme.

The FDM scheme is to allocate a frequency band to each user without overlap by dividing frequency resources of a shared radio resource. The FDM scheme is based on an asynchronous scheme where a specific signal is recovered through filtering. Also, according to FDM scheme, if contiguous signals are transmitted such as a voice over internet protocol (VoIP), signals of multiple users are transmitted on one transmission path at the same time.

The TDM scheme is to allocate a part of a transmission time of a shared radio resource to each user by dividing the transmission time. The TDM scheme is based on a synchronous scheme where a specific signal can be received by selection of a time slot and timing information is required.

The existing radio resource multiplexing scheme such as the FDM scheme or the TDM scheme shares a radio resource within a cell zone where a base station provides a service, regardless of antennas.

On the other hand, the present invention is to provide a radio resource multiplexing scheme that shares a radio resource per DA or DA group. For example, if the FDM or TDM scheme is used, a radio resource can be managed in such a manner that frequency resources or time resources are divided into one or more zones, whereby a separate DA or DA group performs transmission and reception on a zone allocated thereto. Hereinafter, the FDM or TDM scheme for DA mentioned in the embodiments of the present invention divides a resource zone based on DA or DA group not the cell zone and uses the divided zones.

DAS base station according to one embodiment of the present invention can allocate a frequency resource(s) in accordance with the FDM scheme or the TDM scheme per antenna distributed in a cell zone where the DAS base station supports a service.

The system according to one embodiment of the present invention includes a system configured to support a DAS only, or a system changed from a current CAS to support a DAS. In case of the former system, the base station can allocate a frequency resource(s) based on DA or DA group distributed in a cell zone where the base station provides a service. In case of the latter system, a frequency resource allocation scheme of CAs distributed in a cell zone depends on the existing resource allocation scheme, and can allocate a frequency resource(s) based on DA or DA group.

Hereinafter, the embodiments of the present invention will be based on, but not limited to, the FDM scheme.

Figure 3:
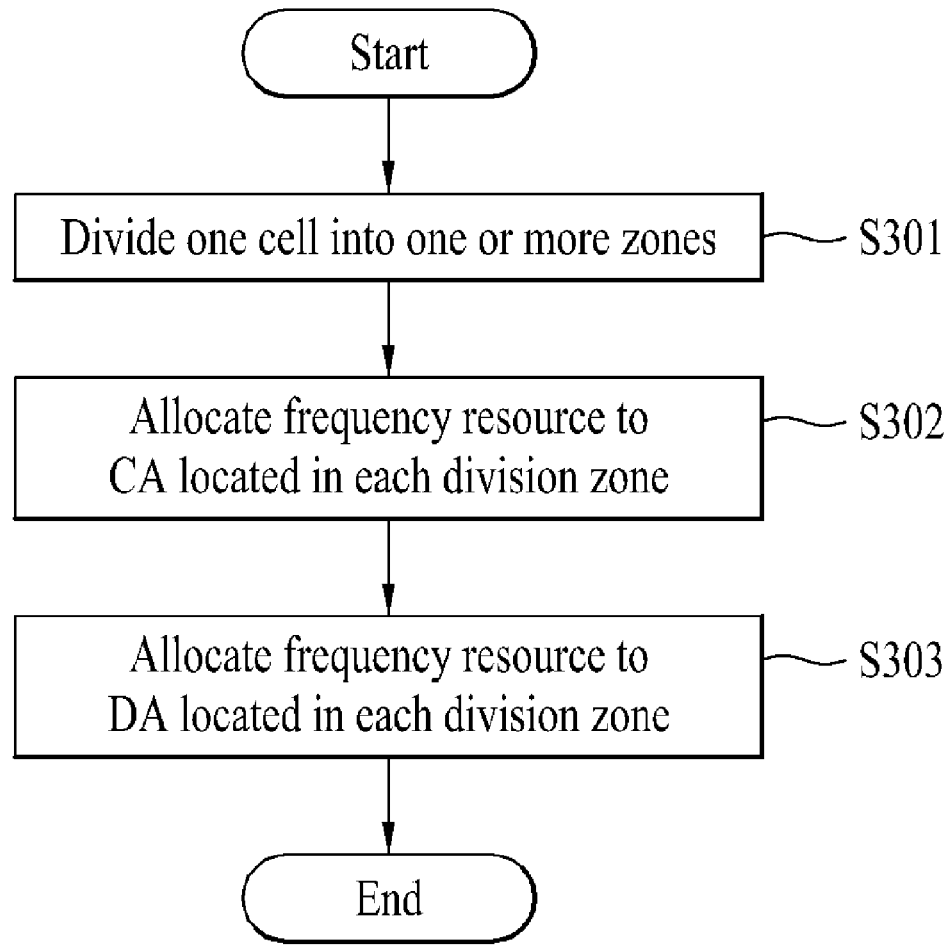
FIG. 3 is a flow chart illustrating a procedure of allocating a frequency resource in a DAS according to one embodiment of the present invention.

FIG. 3 is a flow chart illustrating a procedure of allocating a frequency resource in a DAS according to one embodiment of the present invention. In more detail, FIG. 3 illustrates a frequency resource allocation scheme in a system that supports both a CAS and a DAS.

Referring to FIG. 3, the base station divides a cell zone into one or more zones (S301). The base station provides a service in the cell zone. Hereinafter, the divided cell zone divided from one cell will be defined as a sector.

The base station first allocates a frequency resource(s) to some of a plurality of antennas located in a cell during frequency resource allocation. For example, the base station first allocates the frequency resource(s) to a plurality of CAs located in the center zone of the cell (S302). At this time, a frequency resource(s) fixed for the plurality of CAs can be configured previously.

Frequency resource allocation for CAs is performed in such a manner that CAs fixedly use all frequency bands (F1+F2+F3) or a frequency band is divided into a plurality of frequency subbands (or frequency partitions) to allow CAs located in each sector to use different frequency bands F1, F2 and F3 in accordance with the FDM scheme.

Next, the base station allocates a frequency resource(s) to a plurality of DAs located in the cell (S303).

If the base station allocates the frequency resource(s) to the CAs in the step S302, it can allocate the resource to the DAs by considering a frequency subband currently used by each CA. If the CA currently uses the frequency subband F1, the base station can allocate the resource to the other DAs such that the other frequency bands except for the frequency subband F1 used by the CA are divided in accordance with the FDM scheme or the TDM scheme. In this case, the frequency band used by each DA may be varied depending on time, and its information can be transmitted to the user equipment located in the cell at a predetermined period or during the occurrence of event.

If the frequency resource(s) is allocated to the CAs in such a manner that different frequency bands are used per sector in accordance with the FDM scheme in the step S302, resource allocation to the DAs can be performed in such a manner that the DAs located in one sector use a frequency subband different from that used by the CA located in the same sector. For example, if the first frequency subband F1 is used for CA1 located in the first sector, resource allocation is performed in such a manner that other frequency band except for the first frequency subband F1 is used for the DAs located in the first sector.

As described above, a cell structure of the frequency resource(s) allocated per antenna in the hybrid system of the CAS and the DAS according to the embodiment of the present invention will be described with reference to FIG. 4.

Figure 4:
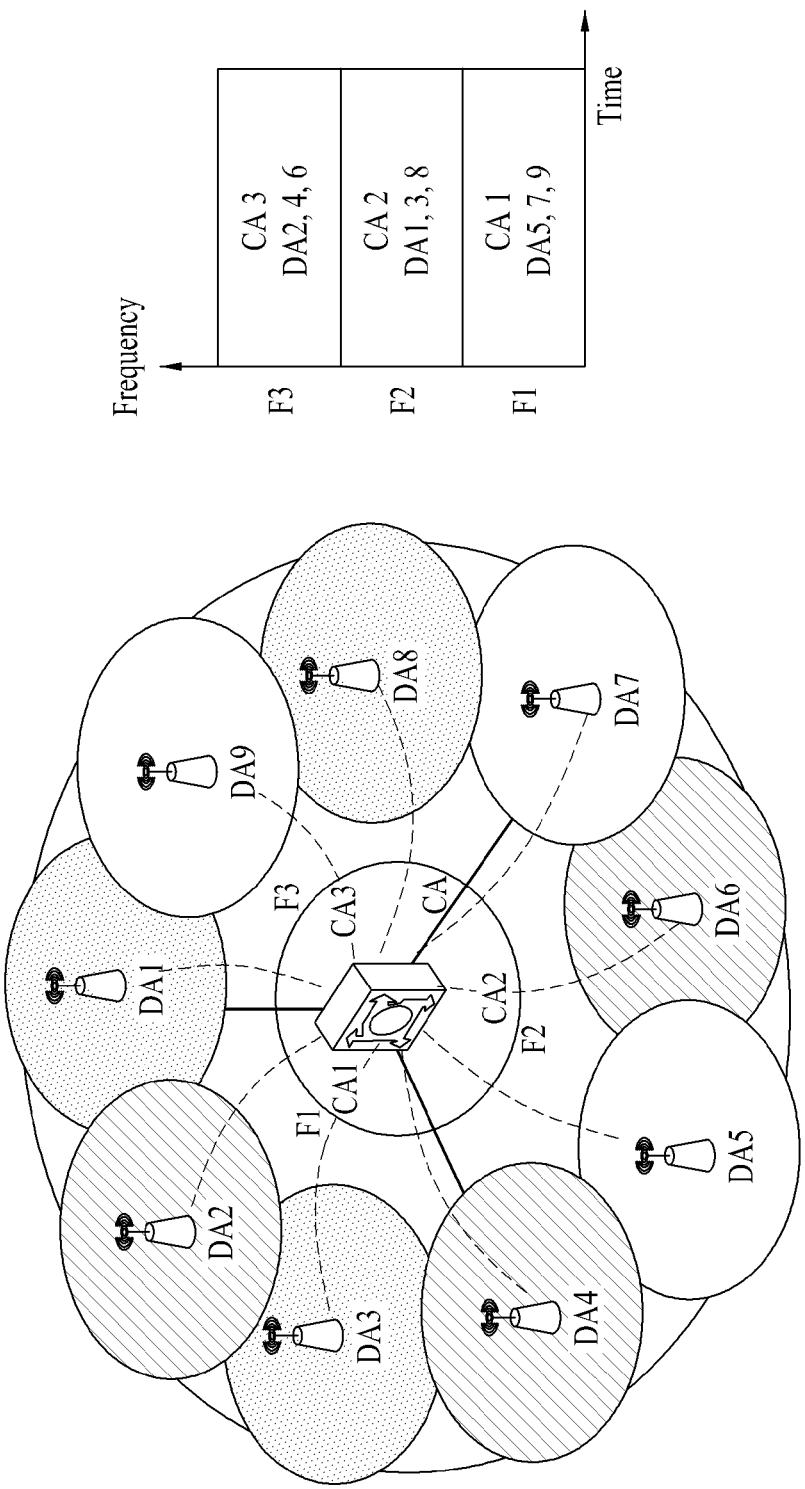
FIG. 4 is a diagram illustrating an example of a cell structure in a DAS according to one embodiment of the present invention.

FIG. 4 is a diagram illustrating an example of a cell structure in a DAS according to one embodiment of the present invention. In more detail, FIG. 4 illustrates an example of a frequency resource(s) allocated per CA and DA in accordance with the FDM scheme in the hybrid system of the CAS and the DAS.

Referring to FIG. 4, CAs located near the base station and a plurality of DAs distributed at a predetermined distance in a cell zone can be located in a cell zone where the base station provides a service. In this case, the base station supports the CAS and the DAS.

The base station can divide a frequency band used by the CAs based on the number of sectors constituting the cell zone. For example, supposing that one cell is divided into three sectors and CA(s) or CA group located in each sector are CA1, CA2 and CA3, respectively, the frequency band used by each of CA1, CA2 and CA3 can be divided into three subbands F1, F2 and F3. In other words, the base station may use the first frequency subband F1 during communication through the CA1 located in the first sector, uses the second frequency subband F2 during communication through the CA2 located in the second sector, and uses the third frequency subband F3 during communication through the CA3 located in the third sector.

Next, a frequency resource(s) for a plurality of DAs located in each sector is allocated not to be the same as the frequency subband used by CA located in the same sector. For example, if the frequency band used by the CA of the first sector is F1, the DAs located in the first sector use any one of the other frequency subbands F2 and F3. At this time, in order to reduce interference between neighboring DAs, resource allocation can be performed in such a manner that the neighboring DAs DA1, DA2 and DA3 located in the first sector use F1, F2 and F3, respectively as illustrated in FIG. 4.

The same method is applied to the other sectors. Accordingly, the frequency resource(s) can be allocated in such a manner that the DAs in the second sector, which uses F2, use F1 and F3, respectively, and the DAs in the third sector, which uses F3, use F1 and F2, respectively.

According to another embodiment of the present invention, resource allocation can be performed in such a manner that some antennas use a whole frequency band in the cell structure illustrated in FIG. 4, and the other antennas use a part of the frequency band by dividing the frequency band in accordance with the FDM scheme.

For example, resource allocation can be performed in such a manner that a plurality of CAs located at the center of the cell use frequency resources (for example, frequency subbands F1, F2 and F3 in the embodiment of FIG. 4), which can be used by the corresponding base station to provide a service, in the hybrid system of the CAS and the DAS.

Also, resource allocation can be performed in such a manner that each DA located in the cell zone uses a frequency resource(s) in accordance with the FDM scheme or the TDM scheme.

If each DA uses the frequency resource(s) in accordance with the FDM scheme, resource allocation can be performed in such a manner that the frequency band is divided into at least two subbands, whereby the same frequency band is not used between the neighboring DAs.

If each DA uses the frequency resource(s) in accordance with the TDM scheme, resource allocation can be performed in such a manner that neighboring DAs use the same frequency band at different times. Alternatively, resource allocation can be performed in such a manner that each DA uses another frequency band different from the frequency band currently used by the CAs. In this case, the frequency resource(s) allocated to each DA may be varied. Accordingly, the base station can allocate frequency resource allocation information to each user equipment periodically or during the occurrence of event.

According to other embodiment of the present invention, resource allocation can be performed in such a manner that a separate frequency resource is used per each antenna or antenna group regardless of DA and CA locate din the cell zone. Hereinafter, an example of the system that supports the DAS will be described in the embodiments of the present invention.

Figure 5:
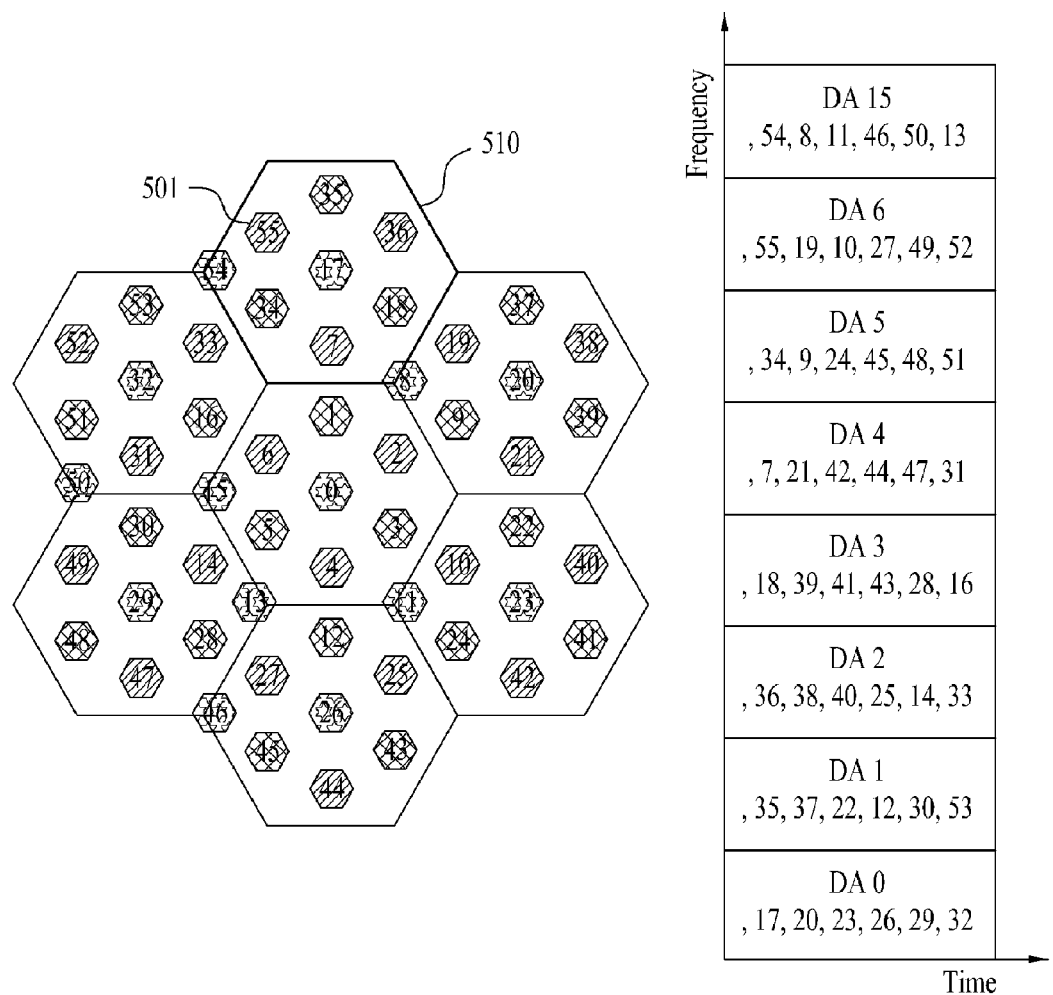
FIG. 5 is a diagram illustrating another example of a cell structure in a DAS according to one embodiment of the present invention.

FIG. 5 is a diagram illustrating another example of a cell structure in a DAS according to one embodiment of the present invention. In more detail, FIG. 5 illustrates an example of a frequency resource allocated per DA in accordance an FDM scheme in a DAS.

In FIG. 5, a hexagonal cell 510 represents a zone where one base station provides a service. It is supposed that a plurality of DAs are distributed in the cell zone 510 at a certain distance while forming their respective DA zones 501. It is also supposed that a plurality of cells having the same structure exist in the cell zone and are controlled by one processing server (PS).

Referring to FIG. 5, the processing server PS can perform resource allocation per DA by dividing a frequency band as much as the number of DAs located in one cell. For example, if eight DAs are distributed in the cell zone including one cell edge zone, the frequency band, which can be used, is divided into eight subbands, and then resource allocation is performed for each DA in accordance with a certain rule. The same resource allocation is applied to the DAs distributed in each cell zone of neighboring cells, whereby the frequency subband can be allocated to the DAs.

Accordingly, as the DAs located in a boundary zone or edge zone of the neighboring cells use their respective frequency subbands, interference between the DAs can be reduced. Also, since each of a plurality of cells uses the same frequency subband depending on the location of the DA, the PS uses a fractional frequency reuse (FFR) scheme.

The embodiment of the present invention based on FIG. 5 illustrates a structure that a specific frequency subband obtained by dividing a frequency band based on the location of each DA is allocated to a DA in a plurality of DAs distributed in the cell zone at a certain interval. Accordingly, allocation of a specific frequency subband can be varied depending on the distribution state of the DAs in the cell zone.

Figure 6:
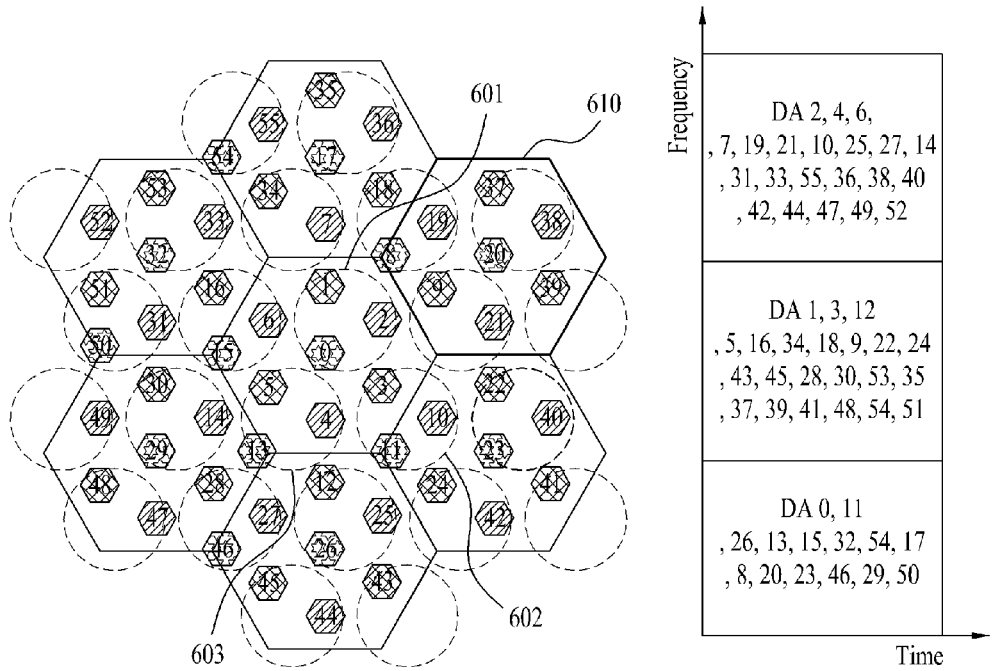
FIG. 6 is a diagram illustrating other example of a cell structure in a DAS according to one embodiment of the present invention.

FIG. 6 is a diagram illustrating other example of a cell structure in a DAS according to one embodiment of the present invention. In more detail, FIG. 6 illustrates an example of a frequency resource allocated per DA group in accordance an FDM scheme in a DAS.

In FIG. 6, it is supposed that a plurality of DAs are distributed in a hexagonal cell zone 610 at a certain distance. It is also supposed that a plurality of cells having the same structure exist in the cell zone and are controlled by one processing server (PS).

At this time, adjacent DAs among the plurality of DAs located in a plurality of cell zones controlled by one processing server can constitute one DA group. For example, DA0, DA1, and DA2 can be configured as a first DA group 601, DA3, DA10 and DA11 can be configured as a second DA group 602, and DA4, DA5, and DA13 can be configured as a third DA group 603.

Each base station or the processing server allocates a resource to each DA group by dividing a whole frequency band based on the DA groups in such a manner that the same frequency subband is not used between neighboring DA groups. For example, resource allocation can be performed in such a manner that the first DA group uses the first frequency subband, the second DA group uses the second frequency subband, and the third DA group uses the third frequency subband.

In other words, according to other embodiment of the present invention, in view of one cell, resource allocation can be performed by division such that three neighboring DA groups use their respective frequency subbands in accordance with the FDM scheme. In view of a plurality of cells, non-neighboring DA groups of the plurality of DA groups can use the same frequency subband in accordance with the FFR scheme.

As described above, the base station according to one embodiment of the present invention, which is based on the frequency resource allocation scheme for reducing inter-antenna interference, can transmit frequency resource allocation information to the user equipment that enters the cell zone. To this end, a procedure of specifying an antenna used for wireless communication with a user equipment that belongs to a DAS is required. Hereinafter, the procedure will be described with reference to FIG. 7.

Figure 7:
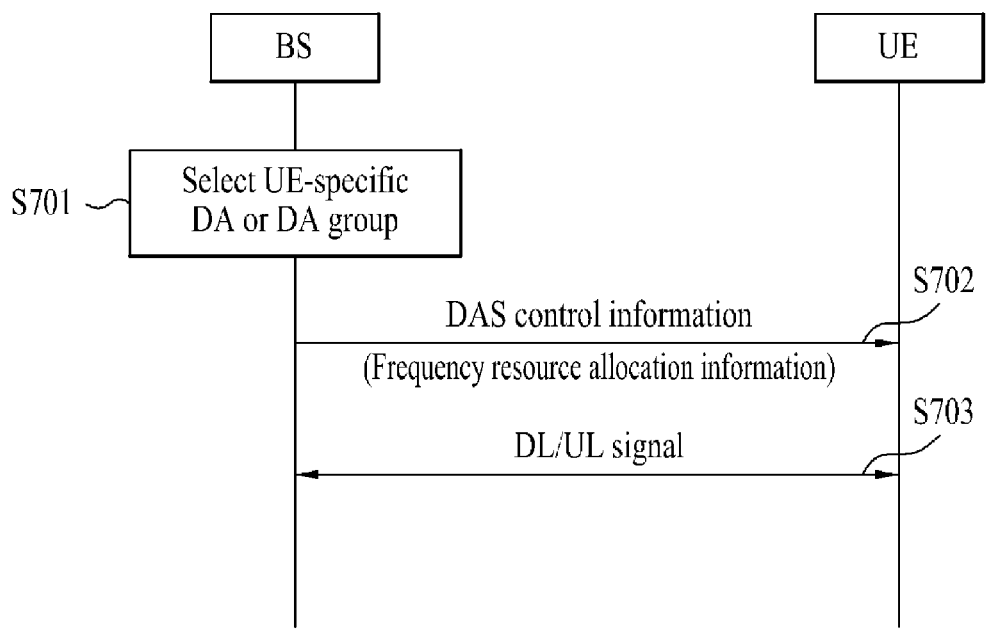
FIG. 7 is a diagram illustrating an example of a procedure of transmitting and receiving a signal between a base station and a user equipment in a DAS according to one embodiment of the present invention.

FIG. 7 is a diagram illustrating an example of a procedure of transmitting and receiving a signal between a base station and a user equipment in a DAS according to one embodiment of the present invention. In this case, it is supposed that the system according to one embodiment of the present invention is the system that supports a DAS only.

Referring to FIG. 7, the base station selects a user equipment-specific DA or DA group, which will be used for communication with the user equipment, from all antennas that belong to the base station (S701). This procedure of selecting a user equipment-specific DA or DA group will be referred to as an antenna resource allocation procedure.

The base station measures an uplink signal, such as data and pilot, which is transmitted from the user equipment, and determines DA or DA group useful for the corresponding user equipment through the measured result. The useful DA or DA group can be used to refer to the user equipment-specific DA or DA group. The useful DA or DA group is defined as a DA or DA group, which satisfies a receiving rate of a certain level or more, among all antennas that belong to the base station.

Alternatively, the base station can determine the user equipment-specific DA or DA group based on feedback information transmitted from the user equipment. The user equipment that has performed communication with the base station receives a downlink signal from the base station, and generates feedback information on a base station antenna, which can be detected by the user equipment, based on the result measured for the received signal. The feedback information can include the number of useful antennas, which can be detected by the corresponding user equipment, and/or antenna index information. In this case, the base station can select the user equipment-specific DA or DA group based on the feedback information.

The base station transmits DAS control information to the user equipment, wherein the DAS control information includes system configuration information, antenna resource allocation information (information on the number of antennas and/or antenna index information) selected for the corresponding user equipment, or frequency resource allocation information (S702).

The antenna resource allocation information is information on the specific DA or DA group for the corresponding user equipment, which is selected in the step S701, and can include the number of useful transmitting antennas and/or antenna index information. At this time, if the base station allocates an antenna resource as indicated by the feedback information transmitted from the user equipment, since the corresponding user equipment knows antenna resource information dedicated to itself, it can transmit the DAS control information without the antenna resource allocation information. Alternatively, the corresponding user equipment can transmit an indicator, which indicates whether the antenna resource has been allocated as indicated by the feedback information.

The frequency resource allocation information is information on the frequency resource used by the DA or DA group dedicated for the corresponding user equipment. The frequency resource that can be used by each DA or DA group can be allocated in accordance with any one of the embodiments of the present invention, which are described with reference to FIG. 3 to FIG. 6.

The DAS control information is independent depending on the corresponding user equipment and can be varied timely depending on the location of the user equipment. Even though the base station performs frequency resource allocation per antenna in accordance with the TDM scheme, the DAS control information can be varied timely. Accordingly, the base station can transmit the DAS control information at a predetermined period or during the occurrence of event.

Afterwards, the base station and the user equipment can perform wireless communication through the specific DA or DA group by using the frequency band allocated to the corresponding DA or DA group.

Second Embodiment

A DAS base station according to one embodiment of the present invention allocates frequency resource(s) to a plurality of antennas such that permutation is independently applied to each antenna at the same frequency band. Permutation means a method of mapping a resource unit in a base station to transmit and receive a signal to and from a user equipment.

Figure 8:
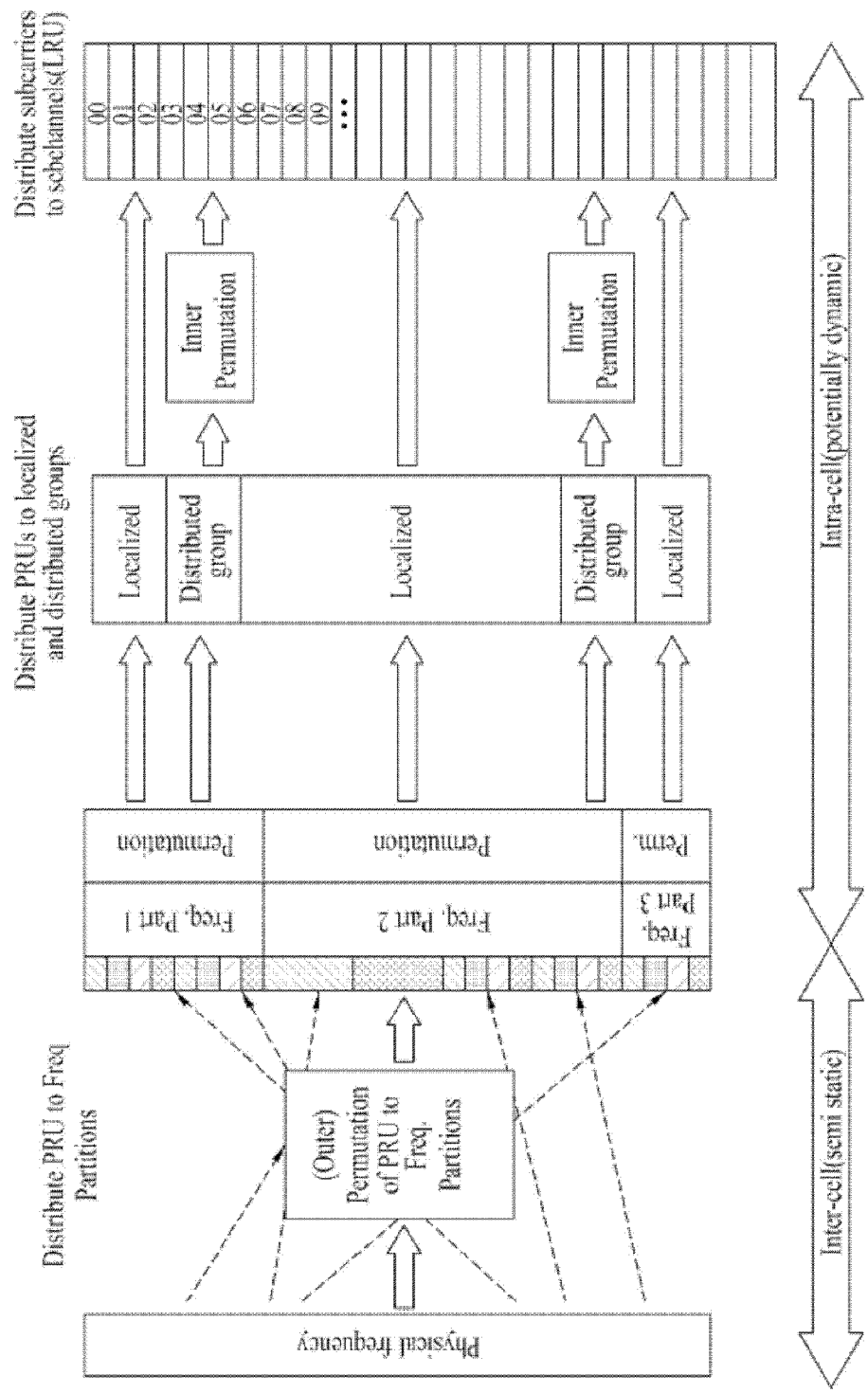
FIG. 8 is a diagram illustrating a procedure of mapping a resource unit.

FIG. 8 is a diagram illustrating a procedure of mapping a resource unit.

Referring to FIG. 8, outer permutation can be performed for physical frequency resources. The outer permutation is applied in at least one physical resource unit (PRU).

The PRU is a basic unit for resource allocation, and includes a plurality of contiguous OFDM symbols in a time domain and a plurality of contiguous subcarriers in a frequency domain. The PRU may be referred to as a distributed resource unit (DRU) or a contiguous resource unit (CRU) depending on a resource allocation mode.

The outer permutation can be performed in N1 or N2 PRUs (N1>N2), wherein N1 and N2 can be varied depending on a bandwidth. However, for efficient outer permutation, N1 should be an integer multiple of N2. The outer permutation may mean a procedure of performing permutation of a PRU unit for a miniband PRU by dividing the PRU into a subband (SB) PRU (hereinafter, $PRU_{SB}$) and miniband (MB) PRU (hereinafter, $PRU_{MB}$) such as subband division, miniband permutation. The $PRU_{SB}$ is a PRU which will be allocated to a subband, and the $PRU_{MB}$ is a PRU which will be allocated to a miniband. In the above procedure, N1 represents the number of PRUs included in the subband, and N2 represents the number of PRUs included in the miniband.

Next, rearranged PRUs are distributed in the divided frequency subbands. Each of the frequency subbands is divided into a logical CRU (LCRU) and a logical DRU (LDRU). Sector specific permutation can be supported, and direct mapping of a resource can be supported for contiguous resources. The size of the distributed/contiguous resources can be flexibly set per sector.

Next, contiguous groups and distributed groups are mapped to LRUs. Inner permutation (or subcarrier permutation) defined for distributed resource allocation distributes subcarriers in all distributed resources. There is no inner permutation for contiguous resource allocation. The PRU can directly be mapped to a contiguous resource unit in each frequency subband.

At this time, a permutation method of a resource unit per antenna according to one embodiment of the present invention can be performed by the inner permutation procedure described with reference to FIG. 8.

The base station according to one embodiment of the present invention can perform independent permutation per DA or DA group while allowing all DAs to use the same frequency band.

Figure 9:
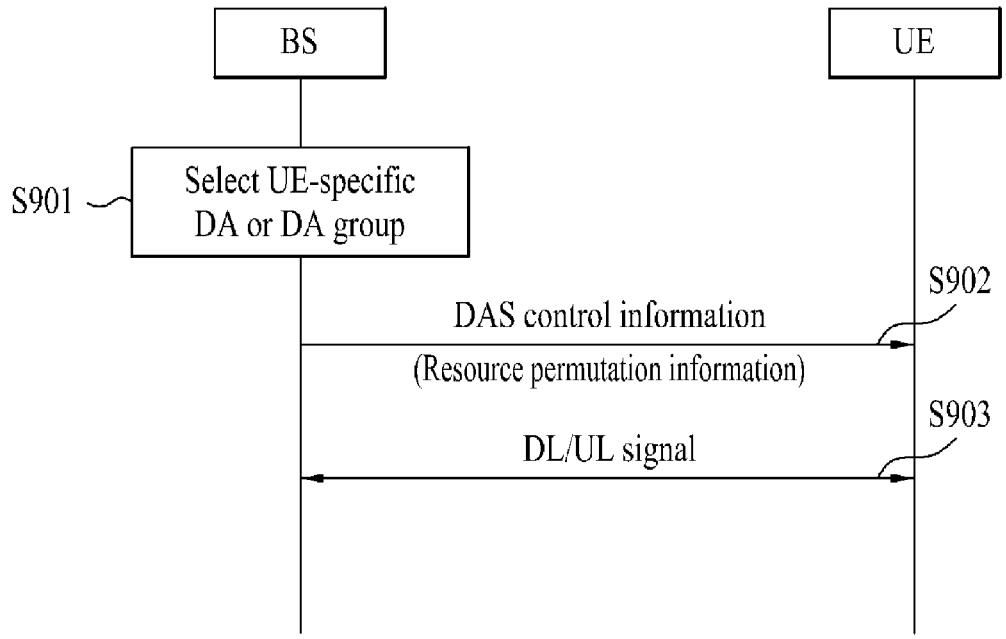
FIG. 9 is a diagram illustrating another example of a procedure of transmitting and receiving a signal between a base station and a user equipment in a DAS according to one embodiment of the present invention.

FIG. 9 is a diagram illustrating another example of a procedure of transmitting and receiving a signal between a base station and a user equipment in a DAS according to one embodiment of the present invention.

Referring to FIG. 9, the base station performs an antenna resource allocation procedure of selecting a DA or DA group dedicated for the user equipment (S901). The antenna resource allocation procedure may be performed by the base station based on the measurement result of the uplink signal, or may be performed based on the feedback information transmitted from the user equipment, in the same manner as the step S701 of FIG. 7. For conciseness of this specification, the same description will be omitted.

Next, the base station transmits DAS control information to the user equipment, wherein the DAS control information may include system configuration information, antenna resource allocation information selected for the corresponding user equipment, or resource permutation information (S902). The antenna resource allocation information is the same as that described with reference to FIG. 7.

According to one embodiment of the present invention, the base station can differently apply a permutation procedure for a resource shared by each DA or DA group. In more detail, one or more of procedures of subband partitioning, miniband permutation, frequency partitioning, CRU/DRU allocation, subcarrier permutation, random sequence generation for permutation, generation of minimum A-MAP logical resource unit (MLRU), and LRU mapping can be set differently. To this end, an antenna index can be used as a factor of a permutation rule. Predetermined permutation can be performed using index information of antennas included in the user equipment-specific DA or DA group selected in the step S901.

The DAS control information can include resource allocation information including information on predetermined permutation applied to the user equipment-specific DA or DA group.

Afterwards, the base station and the user equipment can perform wireless communication through a specific DA or DA group by using the frequency resource allocated to the corresponding DA or DA group (S903).

Figure 10:
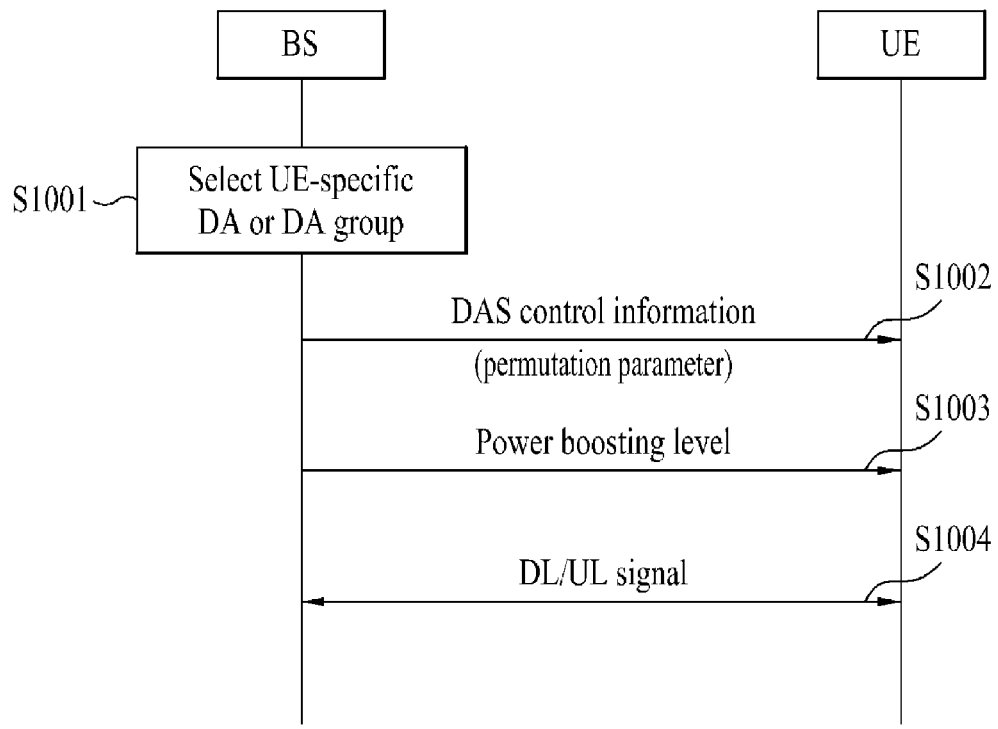
FIG. 10 is a diagram illustrating other example of a procedure of transmitting and receiving a signal between a base station and a user equipment in a DAS according to one embodiment of the present invention.

FIG. 10 is a diagram illustrating other example of a procedure of transmitting and receiving a signal between a base station and a user equipment in a DAS according to one embodiment of the present invention.

Referring to FIG. 10, the base station performs an antenna resource allocation procedure of selecting a DA or DA group dedicated for the user equipment (S1001). The antenna resource allocation procedure may be performed by the base station based on the measurement result of the uplink signal or may be performed based on the feedback information transmitted from the user equipment, in the same manner as the step S701 of FIG. 7. For conciseness of this specification, the same description will be omitted.

Next, the base station transmits DAS control information to the user equipment, wherein the DAS control information includes system configuration information, antenna resource allocation information selected for the corresponding user equipment, or permutation parameter (S1002). The antenna resource allocation information is the same as that described with reference to FIG. 7.

According to one embodiment of the present invention, the base station can differently set one or more of procedures of subband partitioning, miniband permutation, frequency partitioning, CRU/DRU allocation, subcarrier permutation, random sequence generation, generation of minimum A-MAP logical resource unit (MLRU), and LRU mapping. The base station can transmit the parameter used for a predetermined permutation rule applied as resource allocation information to the user equipment through the DAS control information. Alternatively, the base station may transmit permutation parameter information to the user equipment as a separate signal in accordance with a unicast mode, unlike FIG. 10.

The user equipment can determine a resource zone, which can be used during communication with the base station, by acquiring resource allocation information through the permutation parameter.

The base station can transmit information on power boosting level of frequency subband or frequency partitioning to the user equipment as a separate signal in accordance with a unicast mode (S1003).

In the DAS, antenna(s) that can be used for signal transmission and reception are varied depending on the location of the user equipment that has entered the cell zone, and are configured independently. Accordingly, power rate or power boosting level allocated per antenna is varied. Accordingly, the base station according to the embodiment of the present invention can transmit power boosting level information on the antennas included in the user equipment-specific DA or DA group selected in the step S1001 for efficient signal transmission and reception.

Afterwards, the base station and the user equipment can perform wireless communication through the specific DA or DA group by using the frequency resource allocated to the corresponding DA or DA group (S1004).

In the aforementioned embodiments of the present invention, the method of allocating a frequency resource has been suggested to reduce interference per antenna of the base station in the DAS or the hybrid system of the CAS and the DAS.

The base station and the user equipment, which can perform the method of allocating a frequency resource according to the embodiments of the present invention, will be described with reference to FIG. 11.

Figure 11:
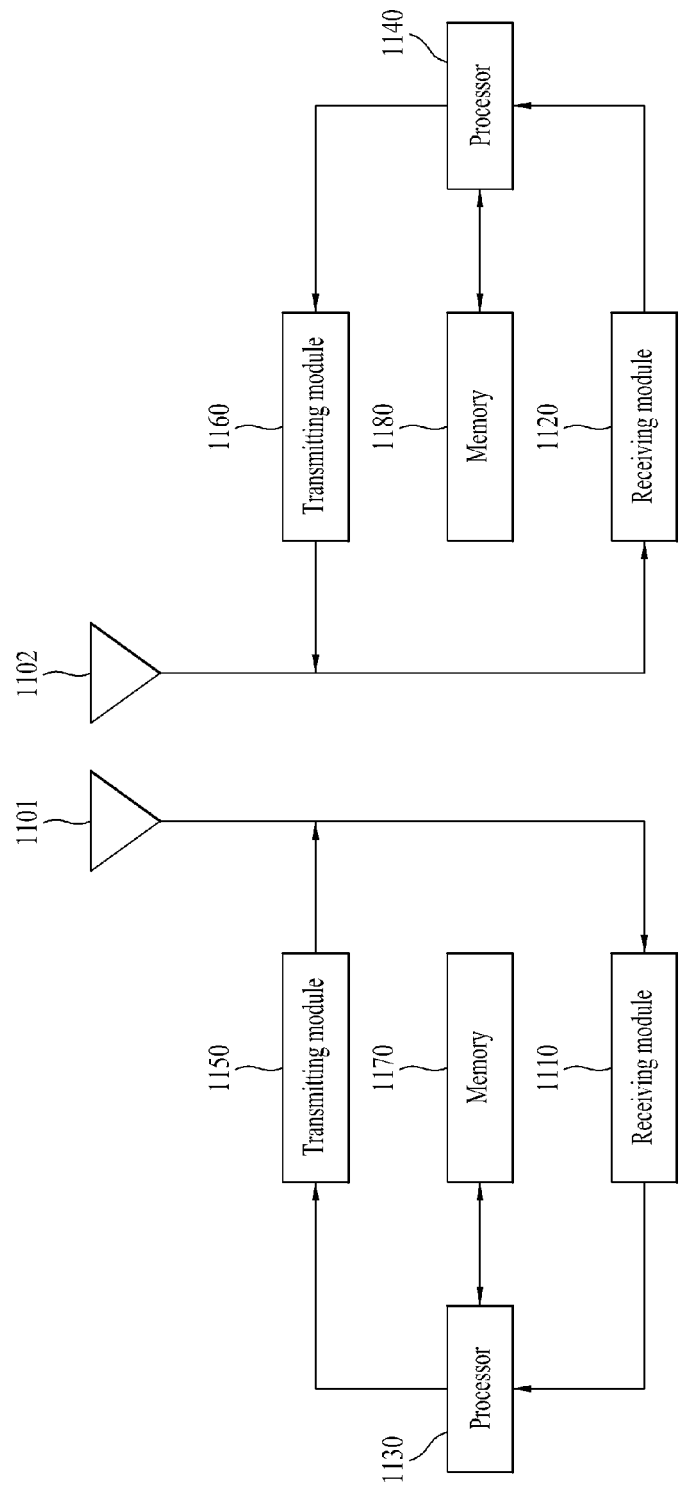
FIG. 11 is a block diagram illustrating a user equipment and a base station in which the embodiments of the present invention can be carried out, in accordance with another embodiment of the present invention.

FIG. 11 is a block diagram illustrating a user equipment and a base station in which the embodiments of the present invention can be carried out.

The user equipment is operated as a transmitting apparatus in an uplink, whereas the user equipment is operated as a receiving apparatus in a downlink. Also, the base station is operated as a receiving apparatus in the uplink, whereas the base station is operated as a transmitting apparatus in the downlink. In other words, each of the user equipment and the base station can include a transmitting apparatus and a receiving apparatus for transmission and reception of information or data.

The transmitting apparatus and the receiving apparatus can include a processor, a module, a part, and/or a means, for which the embodiments of the present invention are carried out. In particular, the transmitting apparatus and the receiving apparatus can include a module (means) for encoding messages, a module for decoding the encoded messages, and an antenna for transmitting and receiving messages.

Referring to FIG. 11, the left side represents a structure of a transmitter, especially a base station that belongs to the DAS, and the right side represents a structure of a receiver, especially a user equipment that has entered a cell where the base station provides a service. Each of the transmitter and the receiver includes an antenna 1101, 1102, a receiving module 1110, 1120, a processor 1130, 1140, a transmitting module 1150, 1160, and a memory 1170, 1180.

The antenna 1101, 1102 includes a receiving antenna receiving a radio signal from the outside and forwarding the received signal to the receiving module 1110, 1120, and a transmitting antenna transmitting a signal generated by the transmitting module 1150, 1160 to the outside. If a MIMO function is supported, two or more antennas may be provided.

The antenna 1101 of the transmitting apparatus as illustrated in FIG. 11 represents one or more DAs selected from a plurality of DAs spaced apart from one another within a specific zone such as a cell supported by the base station, among all antennas of the base station, wherein the one or more DAs are selected based on the channel status during communication between the transmitting apparatus and the receiving apparatus, the location of the user equipment, the distance between the base station and the user equipment, etc. The selected one or more DAs can be changed depending on location change of the receiving apparatus.

The receiving module 1110, 1120 performs decoding and demodulation for the radio signal received from the outside through the antenna to recover original data and then forward the recovered data to the processor 1130, 1140. The receiving module and the antenna may be replaced with a receiving unit for receiving a radio signal, unlike FIG. 11.

The processor 1130, 1140 generally controls the whole operation of the transmitting apparatus or the receiving apparatus. In particular, the processor 1130, 1140 can perform a controller function for performing the aforementioned embodiments of the present invention, a medium access control (MAC) frame variable control function based on service characteristics and radio wave condition, a handover function, an authentication and encryption function, etc.

The transmitting module 1150, 1160 performs predetermined coding and modulation for data, which are scheduled from the processor 1130, 1140 and then transmitted to the outside, and then transfers the coded and modulated data to the antenna. The transmitting module and the antenna may be replaced with a transmitting unit for transmitting a radio signal, unlike FIG. 11.

The memory 1170, 1180 may store a program for processing and control of the processor 1130, 1140, or may perform a function for temporarily storing input/output data (in case of the user equipment, UL grant allocated from the base station), system information, station identifier (STID), flow identifier (FID), action time, etc.

Also, the memory 1170, 1180 can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 1130 of the transmitting apparatus side performs the whole control operation of the base station, and performs antenna resource allocation for selecting DA or DA group suitable for communication with the receiving apparatus. At this time, the processor 1130 of the transmitting apparatus can allocate specific DA for communication to each user equipment or receive DA specific information from the receiver, i.e., the user equipment.

The processor 1130 of the transmitter can allocate a frequency resource to be used for communication with the receiver. At this time, resource allocation can be performed through a specific frequency band or a specific permutation in accordance with the embodiments of the present invention, as described with reference to FIG. 3 to FIG. 10.

Also, the processor 1130 of the transmitter can configure DAS control information and transmit the DAS control information to the receiver, wherein the DAS control information includes configuration information of the DAS, antenna resource allocation information on DA or DA group dedicated for the receiver, or frequency resource allocation information.

The receiver receives the signal and the DAS control information from the transmitter through the receiving module 1120, thereby acquiring the information on the specific DA or DA group used for communication with the transmitter and the frequency resource information.

The processor 1140 of the receiving apparatus also performs the whole control operation of the user equipment. At this time, the processor 1140 of the receiver can determine the number of useful antennas and/or index information of the base station that can be detected by the user equipment by measuring the downlink signal transmitted from the transmitter, thereby configuring feedback information.

Also, the processor 1140 can transmit and receive a signal to and from the transmitter through the frequency resource zone allocated in accordance with the embodiments of the present invention described with reference to FIG. 3 to FIG. 10.

In the mean time, the base station can perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or can further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to a BS, a UE, or other communication devices in a wireless communication system.

The invention claimed is:

1. A method of transmitting a signal by a base station to a user equipment in a wireless access system supporting a distributed antenna system, the method comprising:
   allocating a resource area to each of a plurality of distributed antenna (DA) groups in accordance with a radio resource multiplexing scheme;
   transmitting, to the user equipment, DA power boosting information for a power boosting level, wherein the DA power boosting information is independently configured for each of the DA groups; and
   transmitting the signal to the user equipment using the resource zone allocated to the DA group and based on the DA power boosting information,
   wherein the resource area is applied by a different permutation scheme by each of the DA groups, and
   wherein the permutation scheme is determined according to a DA index of the DA group.

2. The method of claim 1, wherein the step of allocating the resource area includes dividing frequency resources to allow each DA group to use a frequency band different from that of another neighboring DA group.

3. The method of claim 2, wherein each of a number of centralized antennas (CAs) located in each cell-division zone uses its respective frequency band based on one or more cell-division zones constituting a cell zone where the base station provides a service.

4. The method of claim 3, wherein the step of allocating the resource area includes dividing the other frequency band except for the frequency band allocated to the CA located in the same cell division zone as that of the DA group.

5. The method of claim 2, wherein the step of allocating the resource area includes dividing all frequency bands used by the base station depending on the number of DA groups and allocating the divided frequency bands to each of the DA groups.

6. The method of claim 1, wherein the step of allocating the resource area includes dividing the radio resource into time resources to allow each DA group to use the same frequency band as that of another neighboring DA group at different time bands.

7. The method of claim 1, further comprising the step of transmitting, to the user equipment, at least one of information on a DA group dedicated for the user equipment and information on a resource zone allocated to the DA group dedicated for the user equipment.

8. A method of receiving a signal by a user equipment from a base station in a wireless access system supporting a distributed antenna system, the method comprising:
   receiving information on a specific one of a plurality of distributed antenna (DA) groups associated with the user equipment and information of a resource area allocated to the specific DA group;
   receiving DA power boosting information for a power boosting level, wherein the DA power boosting information is independently configured for each of the DA groups; and receiving the signal from the base station through the resource area allocated to the specific DA group and based on the DA power boosting information, wherein the resource area is applied by a different permutation scheme by each of the DA groups, and wherein the permutation scheme is determined according to a DA index of the DA group.

9. The method of claim 8, wherein the resource area allocated to the specific DA group is a frequency resource area allocated by dividing a radio resource into frequency resources to allow each DA group to use a frequency band different from that of another neighboring DA group.

10. The method of claim 9, wherein the resource area allocated to the specific DA group is a part of the other frequency resources except for the frequency resource used by a CA located in a specific cell division zone of the specific DA group when each of CAs located in each cell division zone uses its respective frequency band based on one or more cell division zones constituting a cell zone where the base station provides a service.

11. The method of claim 9, wherein the resource area allocated to the specific DA group is a part of all frequency bands divided depending on the number of the DA groups.

12. The method of claim 8, wherein the resource area allocated to the specific DA group is allocated by dividing the radio resource into time resources to allow each DA group to use the same frequency band as that of another neighboring DA group at different time bands.

13. A base station for transmitting a signal in a wireless access system supporting a distributed antenna system, the base station comprising:

an antenna module including distributed antenna (DA) groups;

a processor configured to:

allocate a resource area to each of the distributed antenna groups in accordance with a radio resource multiplexing scheme;

transmit, to a user equipment, DA power boosting information for a power boosting level, wherein the DA power boosting information is independently configured for each of the DA groups; and transmit the signal to the user equipment using the resource zone allocated to the DA group and based on the DA power boosting information, wherein the resource area is applied by a different permutation scheme by each of the DA groups, and wherein the permutation scheme is determined according to a DA index of the DA group.

14. A user equipment for receiving a signal from a base station in a wireless access system supporting a distributed antenna system, the user equipment comprising:

a receiving module for receiving the signal; and a processor configured to:

receive information on a specific one of a plurality of distributed antenna (DA) groups associated with the user equipment and information of a resource area allocated to the specific DA group;

receive DA power boosting information for a power boosting level, wherein the DA power boosting information is independently configured for each of the DA groups; and receive the signal from the base station through the resource area allocated to the specific DA group and based on the DA power boosting information, wherein the resource area is applied by a different permutation scheme by each of the DA groups, and wherein the permutation scheme is determined according to a DA index of the DA group.

15. The method of claim 1, wherein the permutation scheme has at least one different configuration for each of the DA groups among subband partitioning, miniband permutation, frequency partitioning, contiguous resource unit (CRU)/distributed resource unit (DRU) allocation, subcarrier permutation, random sequence generation for permutation, generation of minimum A-MAP logical resource unit (MLRU) and LRU mapping.

16. The method of claim 8, wherein the permutation scheme has at least one different configuration for each of the DA groups among subband partitioning, miniband permutation, frequency partitioning, contiguous resource unit (CRU)/distributed resource unit (DRU) allocation, subcarrier permutation, random sequence generation for permutation, generation of minimum A-MAP logical resource unit (MLRU) and LRU mapping.

* * * * *